US008892901B2

(12) United States Patent
Han

(10) Patent No.: US 8,892,901 B2
(45) Date of Patent: Nov. 18, 2014

(54) METHOD AND APPARATUS FOR ENCRYPTING USER DATA

(75) Inventor: Hye Jin Han, Incheon Metropolitan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 253 days.

(21) Appl. No.: 12/590,274

(22) Filed: Nov. 4, 2009

(65) Prior Publication Data

US 2010/0115289 A1    May 6, 2010

(30) Foreign Application Priority Data

Nov. 6, 2008    (KR) ........................ 10-2008-0109628

(51) Int. Cl.
*G06F 12/14*    (2006.01)
*G06F 21/62*    (2013.01)
*H04L 9/08*    (2006.01)

(52) U.S. Cl.
CPC ........ *G06F 21/6245* (2013.01); *G06F 21/6209* (2013.01); *H04L 2209/80* (2013.01); *H04L 9/08* (2013.01); *G06F 2221/2107* (2013.01); *H04L 2209/60* (2013.01)
USPC ................. 713/189; 726/27; 726/28; 726/30; 380/30; 715/764

(58) Field of Classification Search
CPC ............ G06F 21/6245; G06F 21/6209; G06F 2221/2107; H04L 9/08; H04L 2209/80
USPC ................... 713/189; 726/27, 28, 30; 380/30; 715/764
See application file for complete search history.

(56) References Cited

U.S. PATENT DOCUMENTS

| | | | | |
|---|---|---|---|---|
| 7,426,054 | B1 * | 9/2008 | Saito ............................ | 358/1.16 |
| 7,698,571 | B2 * | 4/2010 | Harada et al. ................. | 713/193 |
| 2001/0050990 | A1 * | 12/2001 | Sudia ............................ | 380/286 |
| 2005/0091499 | A1 * | 4/2005 | Forlenza et al. .............. | 713/176 |
| 2005/0136979 | A1 * | 6/2005 | Dietl et al. .................... | 455/558 |
| 2008/0307234 | A1 * | 12/2008 | Salowey et al. ............... | 713/182 |
| 2009/0086964 | A1 * | 4/2009 | Agrawal et al. ................ | 380/44 |

FOREIGN PATENT DOCUMENTS

| | | |
|---|---|---|
| CN | 101079110 A | 11/2007 |
| KR | 100650680 B1 | 11/2006 |
| KR | 20070064694 A | 6/2007 |

OTHER PUBLICATIONS

European Search Report dated Jan. 13, 2010 in connection with European Patent Application No. 09 17 4980.
Korean Office Action dated Nov. 26, 2012 in connection with Korean Patent Application No. 10-2008-0109628, 8 pages.
Chinese Office Action dated Jul. 21, 2014 in connection with Chinese Patent Application No. 200910220836.1, 14 pages.

* cited by examiner

*Primary Examiner* — Kambiz Zand
*Assistant Examiner* — Ayoub Alata

(57) ABSTRACT

A mobile terminal is capable of performing message encryption. The mobile terminal includes a display unit that can display contents of a message and an input unit that can receive a selection input for a portion of the displayed content. A portion of the displayed content can be selected for encryption. The selected portion of the displayed content is encrypted. The mobile terminal can store the message containing the encrypted content and information regarding the password.

20 Claims, 8 Drawing Sheets

METHOD AND APPARATUS FOR ENCRYPTING USER DATA

CROSS-REFERENCE TO RELATED APPLICATION(S) AND CLAIM OF PRIORITY

The present application is related to and claims priority to an application entitled "METHOD AND APPARATUS FOR ENCRYPTING USER DATA" filed in the Korean Intellectual Property Office on Nov. 6, 2008 and assigned Serial No. 10-2008-0109628, the contents of which are incorporated herein by reference.

TECHNICAL FIELD OF THE INVENTION

The present invention relates to encryption technology, and more particularly, to a method and apparatus for encrypting part of user data.

BACKGROUND OF THE INVENTION

With the development of technology, portable terminals can provide high quality and varied services. In modern life, most people use the portable terminals and store a variety of personal information therein. If a portable terminal is lost, the portable terminal owner's personal information may be disclosed by the person who picks up the portable terminal. In order to resolve this problem, encryption technology has been recently researched to protect personal information stored in the portable terminal against disclosure.

Services using user data in a portable terminal require a portable terminal user's personal information. Examples of user data refer to a phone book, schedule information, text messages, and the like. Most user data contains a user's personal information. Some text messages transmitted or received through a message service may contain important information and be frequently stored in the storage unit of the portable terminal. If this portable terminal is lost, a person who picked up the portable terminal may open the text messages and disclose the portable terminal owner's personal information. In order to prevent personal information or important information from being disclosed, user data needs to be encrypted. Conversely, if all the user data are encrypted in a portable terminal, the portable terminal owner may feel inconvenienced since he/she is required to decrypt unimportant user data. Therefore, it is necessary to encrypt part of user data in a portable terminal, protecting the portable terminal user's personal information against disclosure, and to provide use convenience to the user.

SUMMARY OF THE INVENTION

To address the above-discussed deficiencies of the prior art, it is a primary object to provide a method and apparatus for encrypting part of user data in a portable terminal.

In accordance with an exemplary embodiment of the present invention, the present invention provides a message encryption method including: displaying content of a message; selecting a portion of the displayed content if an encryption request is input; and encrypting the selected portion of the displayed content. It is preferable that encrypting the selected portion of the displayed content further includes setting a password for encryption.

In accordance with another exemplary embodiment of the present invention, the present invention provides a message encryption apparatus including: a display unit that can display content of a message; an input unit that can receive a selection input for a portion of the displayed content; and a controller that can select the portion of the displayed content according to the selection input if a request to encrypt the content is input, and can encrypt the selected portion of the displayed content. It is preferable that the controller further includes a storage unit that can store the message containing the encrypted content and information regarding the password.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the method for encrypting part of user data according to an embodiment of the present invention, user data is explained based on a text message. It should be understood that the present invention is not limited to the embodiment. For example, the user data may be data related to a phone book, a schedule, and the like.

Figure 1:
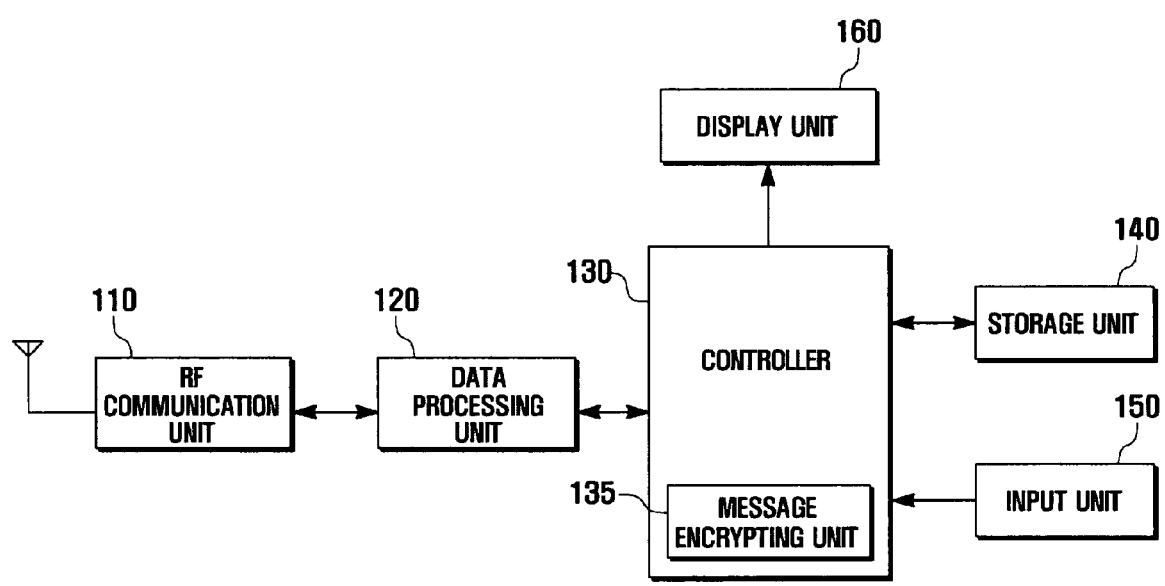
FIG. 1 illustrates a schematic block diagram for a portable terminal that can encrypt part of user data, according to an embodiment of the present invention.

FIG. 1 illustrates a schematic block diagram for a portable terminal that can encrypt part of user data, according to an embodiment of the present invention. Although the portable terminal according to the present invention is explained based on a mobile communication terminal that can wirelessly transmit/receive a text message, the present invention is not limited to the embodiment. It will be understood that the present invention can be applied to all types of terminals that can process user data that allows for partial encryption settings.

Referring to FIG. 1, the RF communication module 110 can perform RF communication with a base station. To this end, the RF communication module 110 includes an RF transmitter for up-converting the frequency of transmitted signals and amplifying the transmitted signals and an RF receiver for low-noise amplifying received RF signals and down-converting the frequency of the received RF signals. The data processing unit 120 can process data output from the RF communication module 110 or numerical or character data input by a use via the input unit 150. The data processing unit 120 includes a modulator/demodulator (modem) and a coder/decoder (codec) to process data. The controller 130 can control the entire operation of the portable terminal.

When a request to set/release a partial encryption is input while a stored text message is viewed or a text message to be transmitted is written, the controller 130 requests an input of a password. If the controller 130 ascertains that the input password is consistent with a preset password, it performs an encryption or releases encryption, with respect to a selected portion.

The controller 130 can include a message encrypting unit 135 that performs encryption and releases encryption, with respect to part of data contained in a stored text message or in a written message. In some embodiments, the password used for encryption is the same as the password set for the security of the portable terminal. That is, the password requested when a partial encryption is set is the password that is set to secure all functions of the portable terminal. The password set for the security of the portable terminal may be assigned to a value, initialized when the portable terminal is manufactured, for example, '0000'. A user can change the initially assigned password. In an embodiment of the present invention, the password set for the security of the portable terminal previously is determined and stored in the portable terminal.

The storage unit 140 can include a program memory area and a data memory area. The program memory area stores application programs required to operate a variety of functions in the portable terminal. The data memory area can store data generated when the application programs are executed. In an embodiment of the present invention, the storage unit 140 stores a password set for the security of the portable terminal, receives text messages, partial encryption information, and the like. The partial encryption information can refer to information about a portion set by a partial encryption. If a partial encryption uses a password other than the password that is set for the security of the portable terminal, the storage unit 140 can also store information about the password for the partial encryption.

The input unit 150 can receive numerical/character data input by the user.

The display unit 160 can display user data according to the control of the controller 130. The display unit 160 can be implemented with an LCD. In this example, the display unit 160 can further include an LCD controller, a memory for storing image data, and an LCD device. In particular, if the LCD is implemented by a touch screen, the display unit 160 can also serve as an input device.

Figure 2:
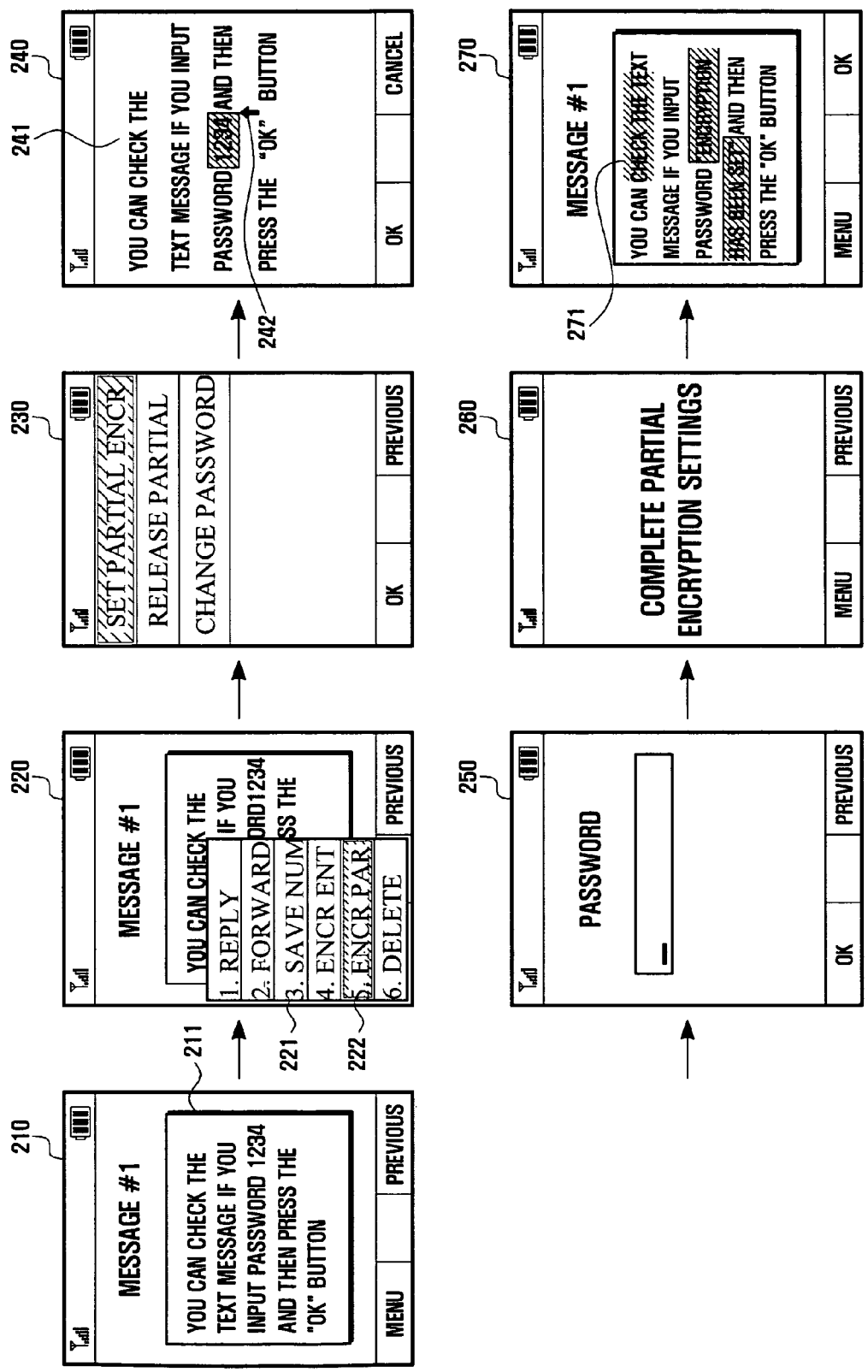
FIG. 2 illustrates a view of screens showing the process of setting a partial encryption to a text message, according to an embodiment of the present invention.

FIG. 2 illustrates a view of screens showing the process of setting a partial encryption to a text message, according to an embodiment of the present invention. The screens show the processes for setting encryption if a partial encryption function is requested during viewing a stored text message.

Referring to FIG. 2, the display unit 160 can display one of the received text messages, Message #1, stored in the storage unit 140, on a screen 210, if a message viewing function is executed. When a particular key, such as a 'menu' key, is pressed to set a partial encryption with respect to content 211 contained in Message #1, screen 210 is changed to screen 220. In an embodiment of the present invention, when a 'menu' key formed in the input unit 150 is input, functions related to a text message, including an encryption function, are displayed on the display unit 160.

While a menu key is input and thus a list 221 of functions related to a text message is displaying on screen 220, if a partial encryption function 222 is selected from the list 221, screen 220 is changed to screen 230 showing a list of partial encryption functions. In an embodiment of the present invention, the partial encryption function is composed of "Set partial encryption," "Release partial encryption," and "Change password for partial encryption." It should be understood that the present invention is not limited to this embodiment. That is, it will be understood that the partial encryption function may further contain other functions related to the partial encryption.

If a menu of 'Set partial encryption' is selected on screen 230, the display unit 160 displays a screen 240 that shows a text message and a part of the text message that will be set in a partial encryption function. A part of the text message can be selected by a variety of methods. For example, as shown on screen 240, a pointer 242 can be moved or selected by the direction keys of the input unit 150. In embodiments wherein the display unit 160 is implemented with a touch screen, a part of the text message can be selected as the user's finger taps a corresponding area.

Some types of information requiring a partial encryption, for example, a phone number, an email address, a URL, and the like, can be selected by a pointer, with a certain size of block, when a screen is changed to screen 240. After a part 241 of the text message that will be set in a partial encryption function has been selected on screen 240, the screen 240 is changed to screen 250 that allows for the input of a password to set encryption for the selected part 241. The password is the same as a previously set password for the security of the portable terminal, and may be set by all data, such as numbers, characters, icons, and so forth, and a combination thereof.

When a password is input on screen 250, the portable terminal determines whether the input password is consistent with the previously set password for the security of the portable terminal. If the portable terminal ascertains that the input password is consistent with the previously set password, a partial encryption is set to the selected part and then a message is shown on screen 260. In an embodiment of the present invention, notification that partial encryption has been set is achieved by the display unit 160. However, it will be understood that the present invention is not limited to the embodiment. For example, such a notification can also be implemented by other means, such as a speaker. After the part of the text message has been set in a partial encryption and then a message view menu is executed, a text message containing a partially encrypted portion 271 is displayed on screen 270 on the display unit 160.

Figure 3:
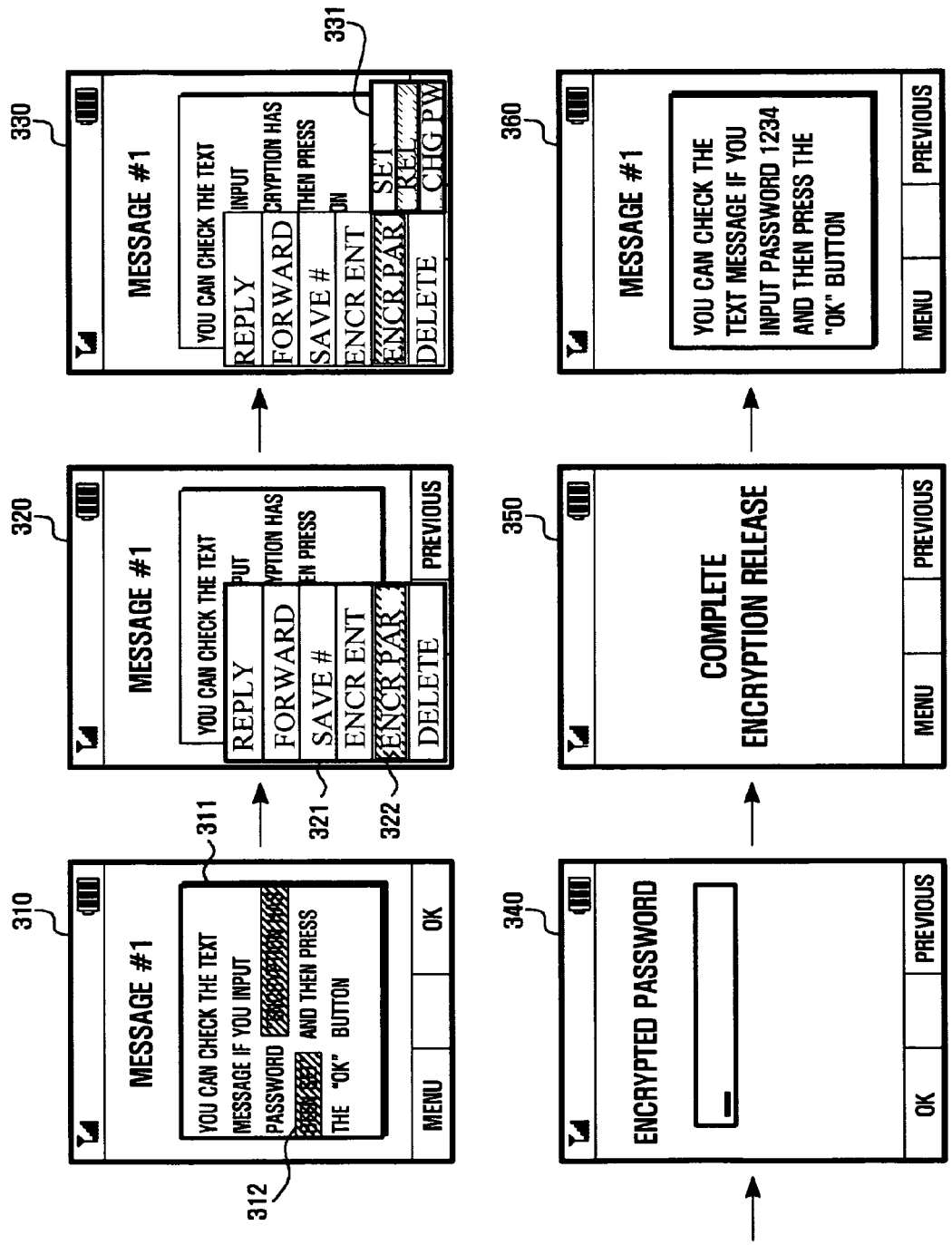
FIG. 3 illustrates a view of screens showing the process of releasing a partial encryption set to a text message, according to an embodiment of the present invention.

FIG. 3 illustrates a view of screens showing the process of releasing a partial encryption set to a text message, according to an embodiment of the present invention.

Referring to FIG. 3, the display unit 160 displays one of the received text messages, Message #1, stored in the storage unit 140, on a screen 310 if message viewing function is executed. In an embodiment of the present invention, the content 311 of Message #1 may contain a partially encrypted portion 312. When a 'menu' key is pressed during the execution of the message viewing function, screen 310 is changed to screen 320.

While the menu key is input and accordingly a menu 321 of functions related to a text message is being displayed on screen 320, if a 'partial encryption' item 322 is selected from the menu 321, screen 320 is changed to screen 330 that shows a submenu 331 of the partial encryption item 322.

While the submenu 331 is being displayed on screen 330, if one of the sub-items in the submenu 331, i.e. a 'Release partial encryption' is selected, screen 330 is changed to screen 340 to input a password that was set to release a function of a preset partial encryption. The password, input when a partial encryption is set, can be a password set to secure the portable terminal.

When a password is input on screen 340, screen 340 is changed to screen 350. That is, if a password is input on screen 340, it is compared with a preset password for the partial encryption. If the input password is consistent with the preset password, screen 340 is changed to screen 350. Otherwise, screen 340 can be changed to a screen requesting the re-inputting of a password from the user.

Screen 350 shows a message informing that the partial encryption has been released. In an embodiment of the present invention, notification that partial encryption has been released is achieved by the display unit 160, it will be understood that that present invention is not limited to the embodiment. For example, such a notification can also be implemented by other means, such as, for example, a speaker. After a partial encryption for the part of the text message has been released, the text message, Message #1, containing the complete content is displayed on screen 360 on the display unit 160 during the execution of a message view menu.

Additionally, the password for the partial encryption is changed in such a way that: a 'Change password for partial encryption is selected from the submenu 331 on screen 330; a preset password is input; and then a new password is input.

Figure 4:
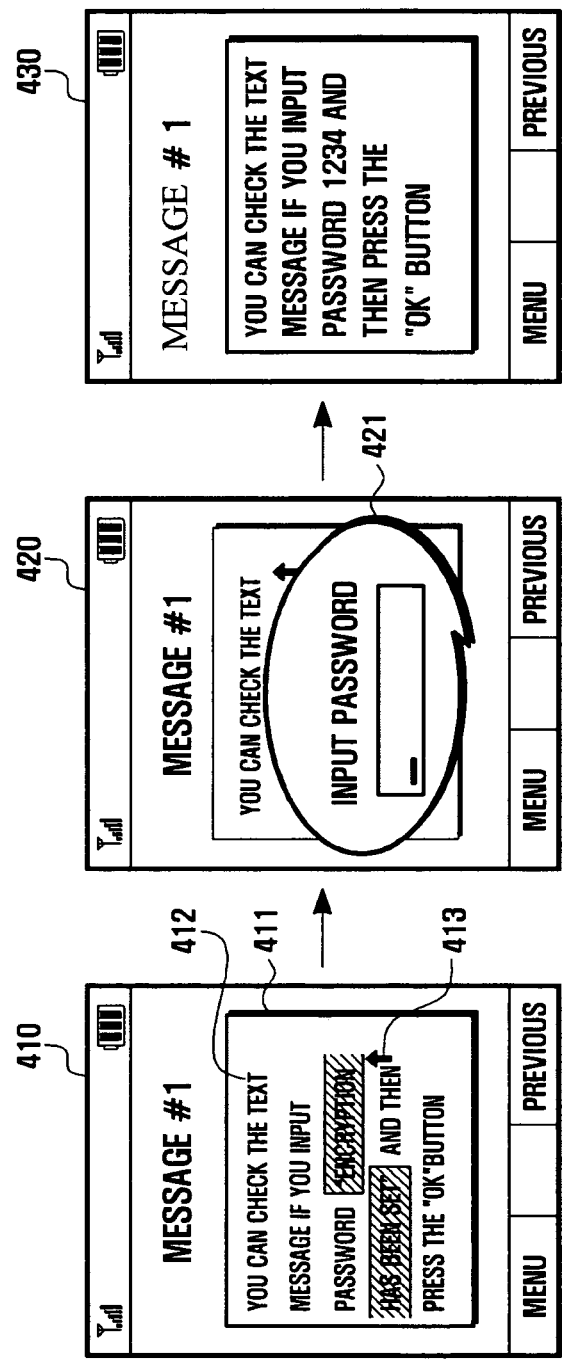
FIG. 4 illustrates a view of screens showing the process of releasing a partial encryption set to a text message, according to another embodiment of the present invention.

FIG. 4 illustrates a view of screens showing the process of releasing a partial encryption set to a text message, according to another embodiment of the present invention.

Referring to FIG. 4, the display unit 160 displays one of the received text messages, Message #1, stored in the storage unit 140, on a screen 410 if message viewing function is executed. In an embodiment of the present invention, the content 411 of Message #1 can contain a partially encrypted portion 412. In an embodiment of the present invention, although the content 411 of Message #1 is implemented to contain one partially encrypted portion 412, it can contain two or more partially encrypted portions. If a pointer 413, for example, is located near the partially encrypted portion 412 on screen 410 while a message view is being executed, the input of a password for releasing the partial encryption regarding the partially encrypted portion 412 may be requested. For example, if the input of a password is requested, a pop-up 421 appears near the partially encrypted portion 412 on screen 420. The pop-up 421 receives the password input when a partial encryption is set. In that case, screen 420 is changed to screen 430.

Meanwhile, if the content 411 of a text message has two or more partially encrypted portions on screen 410, their encryptions can be released by inputting the password, once, on screen 420.

In order to change from screen 420 to screen 430, the password input to the pop-up 421 is compared with a preset password for the partial encryption. If the input password is consistent with the preset password, screen 420 is changed to screen 430. Otherwise, the pop-up 421 does not appear on screen 420, waiting for the re-inputting of a correct password. After a partial encryption for the partially encrypted portion 412 has been released, the text message, Message #1, containing the complete content is displayed on screen 430 on the display unit 160 during the execution of a message view menu.

Figure 5:
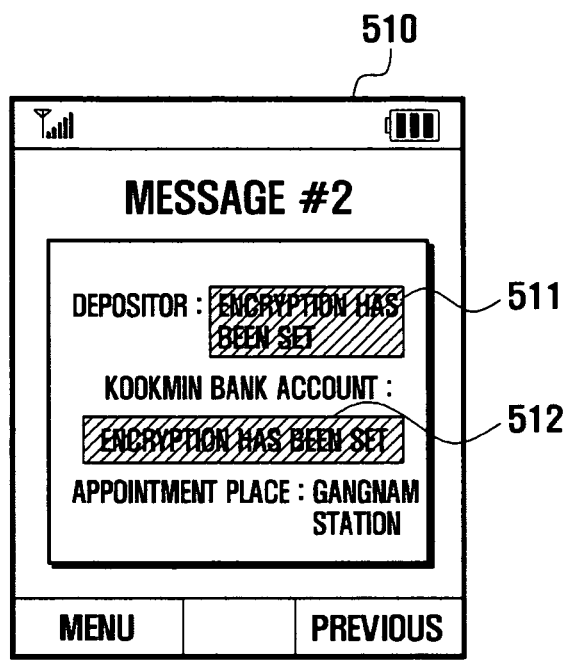
FIG. 5 illustrates a view of a screen showing a text message set by a partial encryption, according to an embodiment of the present invention.

FIG. 5 illustrates a view describing a screen showing a text message set by a partial encryption, according to an embodiment of the present invention.

Referring to FIG. 5, the display unit 160 displays one of the received text messages, Message #2, stored in the storage unit 140, on screen 510 if message view is executed. In an embodiment of the present invention, the content 511 of Message #2 can contain two partially encrypted portions 512 and 513. The number of partially encrypted portions can be set by a plurality of methods. For example, on screen 240 shown in FIG. 2, a plurality of portions are partially selected in the content of Message #1 and then encrypted by a password. The encryption for the partially encrypted portions in the content of Message #1 can be released by inputting the password once on screen 420 as shown in FIG. 4.

In the following description, the function of the partially encrypted portion, the processes for setting or releasing the partially encrypted portion, and the process of changing the password for the partially encrypted portion are explained in detail with reference to FIG. 6.

Figure 6:
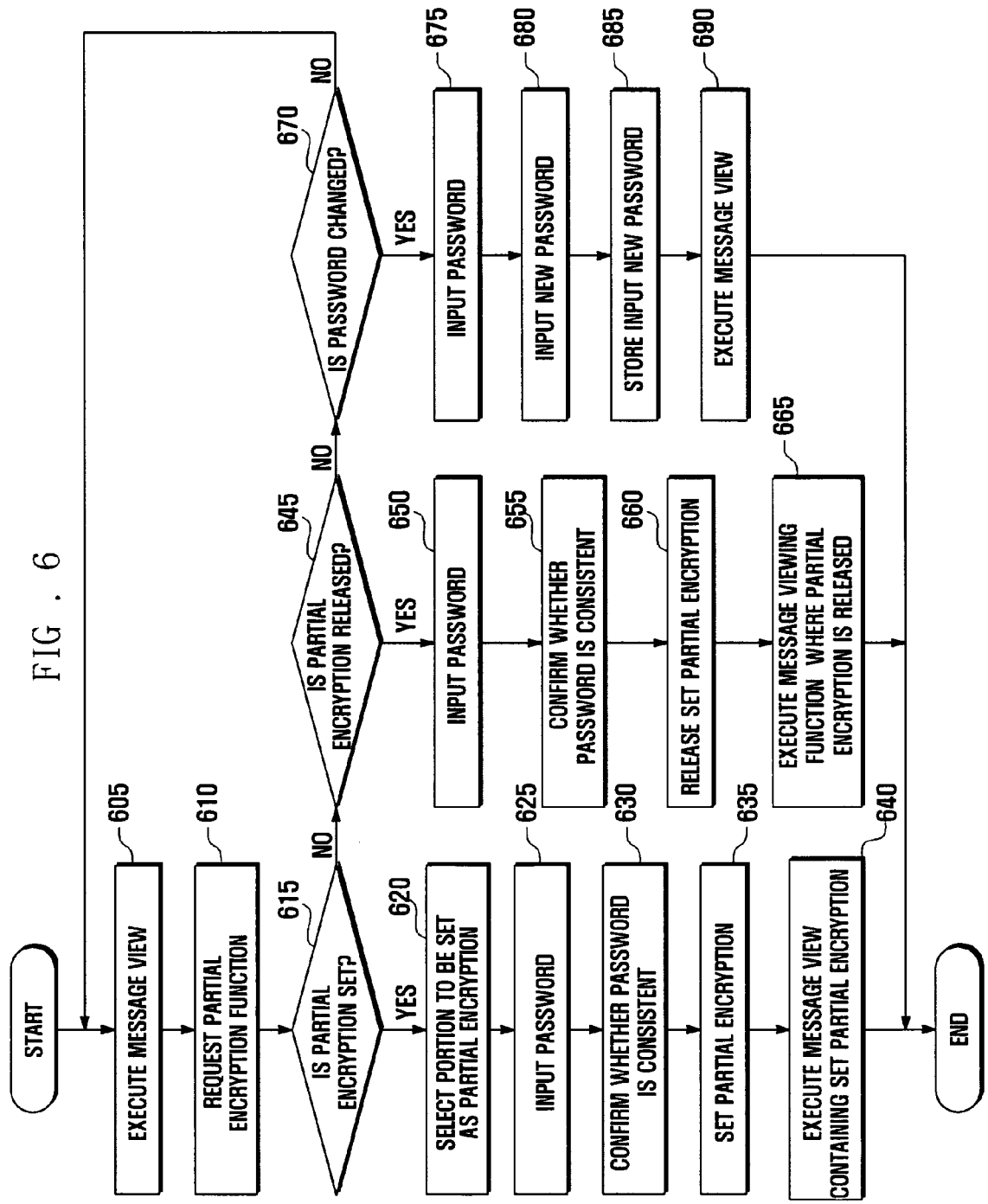
FIG. 6 illustrates a flow chart describing a method for performing a partial encryption, according to an embodiment of the present invention.

FIG. 6 illustrates a flow chart describing a method for performing a partial encryption, according to an embodiment of the present invention.

Referring to FIG. 6, when the controller 130 receives a request to view a stored text message, it displays a corresponding text message on the display unit 160 (block 605). After that, a partial encryption is requested (block 610), the message encrypting unit 135 of the controller 130 determines whether the setting of a partial encryption is requested (block 615).

If the message encrypting unit 135 ascertains that the setting of a partial encryption is requested at block 615, it selects a portion of a text message that will be encrypted (which is called a partially encrypted portion), according to the input of the input unit 150 (block 620). Thereafter, the message encrypting unit 135 receives a password for encrypting the portion of a text message via the input unit 150 (block 625). In an embodiment of the present invention, the password for partial encryption is the password set for the security of the portable terminal. It should be understood that the present invention is not limited to this embodiment. That is, the password for partial encryption may be set to differ from the password set for the security of the portable terminal. The message encrypting unit 135 compares the input password with the preset password (block 630). If the input password is not consistent with the preset password at block 630, the re-inputting of a password is additionally requested (not shown). Alternatively, if the input password is consistent with the preset password at block 630, the message encrypting unit 135 sets the selected portion of the text message by the input password for partial encryption, which is called a partially encrypted portion (block 635). The controller 130 executes a message view function and controls the display unit 160 to display the text message containing the partially encrypted portion (block 640).

Alternatively, if the message encrypting unit 135 ascertains that the setting of a partial encryption is not requested at block 615, it determines whether the release of a partial encryption is requested (block 645).

If the message encrypting unit 135 ascertains that the release of a partial encryption is requested at block 645, it identifies the partially encrypted portion and receives a password for the partially encrypted portion via the input unit 150 from the user (block 650). That is, as shown in FIG. 4, the controller 130 checks whether a pointer 413 is located at the partially encrypted portion 412. If the controller 130 ascertains that a pointer 413 is located at the partially encrypted portion 412, it changes the current screen to a screen showing a password inputting field or displays a pop-up, so that it receives a password via the input unit 150 from the user. Thereafter, the message encrypting unit 135 determines whether the input password is consistent with the preset password. If the message encrypting unit 135 ascertains the input password is consistent with the preset password (block 655), it releases the partial encryption regarding the partially encrypted portion (block 660). On the contrary, if the message encrypting unit 135 ascertains that the input password is not consistent with the preset password, it requests the re-inputting of the password (not shown). The controller 130 executes a message view function and controls the display unit 160 to display the complete text message in which the partial encryption is released (block 665).

Alternatively, if the message encrypting unit 135 ascertains that the release of a partial encryption is not requested at 645, it determines whether the change of a password for partial encryption is requested (block 670).

If the message encrypting unit 135 ascertains that the change of a password for partial encryption is requested at block 670, it receives a new password for partial encryption via the input unit 150 from the user (block 675). In an embodiment of the present invention, the new password for partial encryption is the password set for the security of the portable terminal. If the message encrypting unit 135 ascertains that the new password is consistent with the old password, it receives another new password via the input unit 150 from the user (block 680). When the message encrypting unit 135 ascertains that another new password is not consistent with the old password at 680, it further requests to re-input the newly input password from the user. Thereafter, the message encrypting unit 135 stores the new password for the partially encrypted portion (block 685). The controller 130 executes a message view function and controls the display unit 160 to continue displaying the text message (block 690). Alternatively, if the message encrypting unit 135 ascertains that the change of a password for partial encryption is not requested at 670, it returns to and proceeds with step 605.

Figure 7:
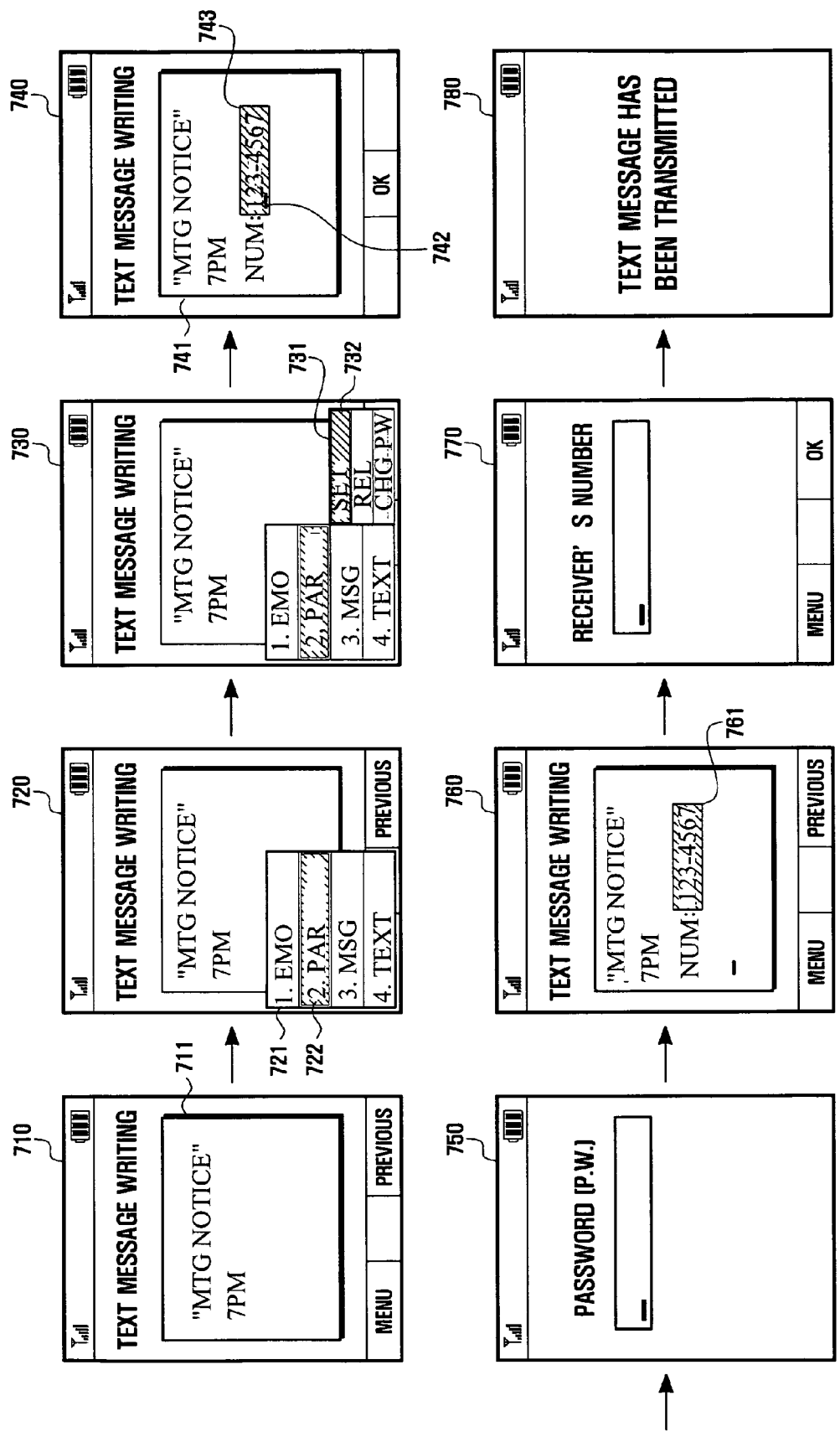
FIG. 7 illustrates a view of screens showing the process of writing and transmitting a text message set by a partial encryption, according to an embodiment of the present invention.

FIG. 7 illustrates a view of screens showing the process of writing and transmitting a text message set by a partial encryption, according to an embodiment of the present invention.

Referring to FIG. 7, the display unit 160 displays a screen 710 when a text message is written in a message writing mode. If a particular key, such as a 'menu' key, is input to set partial encryption in a content of a text message that was written in a message writing mode, the screen 710 is changed to screen 720. In an embodiment of the present invention, a 'menu' key is formed in the input unit 150 and functions related to the text message, including the encryption function, are displayed according to the input of the 'menu' key. When a menu 721 of functions related to the 'menu' key is displayed on screen 720 and an item, a partial encryption 722, is selected from the menu 721, screen 720 is changed to screen 730 that shows a submenu 731 of the partial encryption item 722. If a sub-item, a block setting 732, is selected from the submenu 731 on screen 730, screen 730 is changed to screen 740. On screen 740, a portion of the text message can be selected to set a partial encryption.

To this end, an underbar 742, or a cursor, can be located at the content 741 of the text message on screen 740. As the underbar 742 is moved according the operation of the direction keys of the input unit 150, a portion of the text message, i.e., a highlight bar 743, can be set. Thereafter, as a preset key, for example, an OK key, can be input, the process of selecting a portion for the partial encryption can be completed. In particular, if the portion for the partial encryption, set by the highlight bar 743, corresponds to the type of information, such as a phone number, an email address, a URL, and the like, it can be selected as the underbar or a pointer indicates it when screen 730 is changed to screen 740. That is, such type of information can be selected with a predetermined-size highlight bar, without the operation of direction keys, when it is only indicated by the underbar or the pointer when screen 730 is changed to screen 740.

After a portion for the partial encryption has been selected, screen 740 is changed to screen 750 to input a password. In an embodiment of the present invention, the password is the same as the password to secure the security of the portable terminal, which may be all data, such as number, characters, or icons, and so forth. When a password is input on screen 750, it is compared with the preset password for the security of the portable terminal. If the input password is consistent with the preset password for the security of the portable terminal, the selected portion is set by a partial encryption and then screen 75 is changed to screen 760 that shows a text message containing a partially encrypted portion 761 and allows a user to input other information in a message writing mode. After the text message has been written on screen 760, screen 760 is changed to screen 770. When the user inputs a receiver's number on screen 770, the portable terminal transmits the written text message to the receiver's portable terminal and displays screen 780 showing that the text message has been transmitted. In an embodiment of the present invention, the password set to the partially encrypted portion 761 is converted to a public key and then transmitted to the receiver's portable terminal. In an embodiment of the present invention, the public key refers to a cryptographic key whose cryptograph can be decrypted by a preset cryptographic key for the secrecy of the caller's portable terminal. When the called portable terminal receives a text message containing a partially encrypted portion that is encrypted by a public key and inputs a cryptographic key set to itself, it decrypts the partially encrypted portion in the text message.

In the following description, the process of setting a partial encryption while a text message is writing is explained in detail with Referring to FIG. 8.

Figure 8:
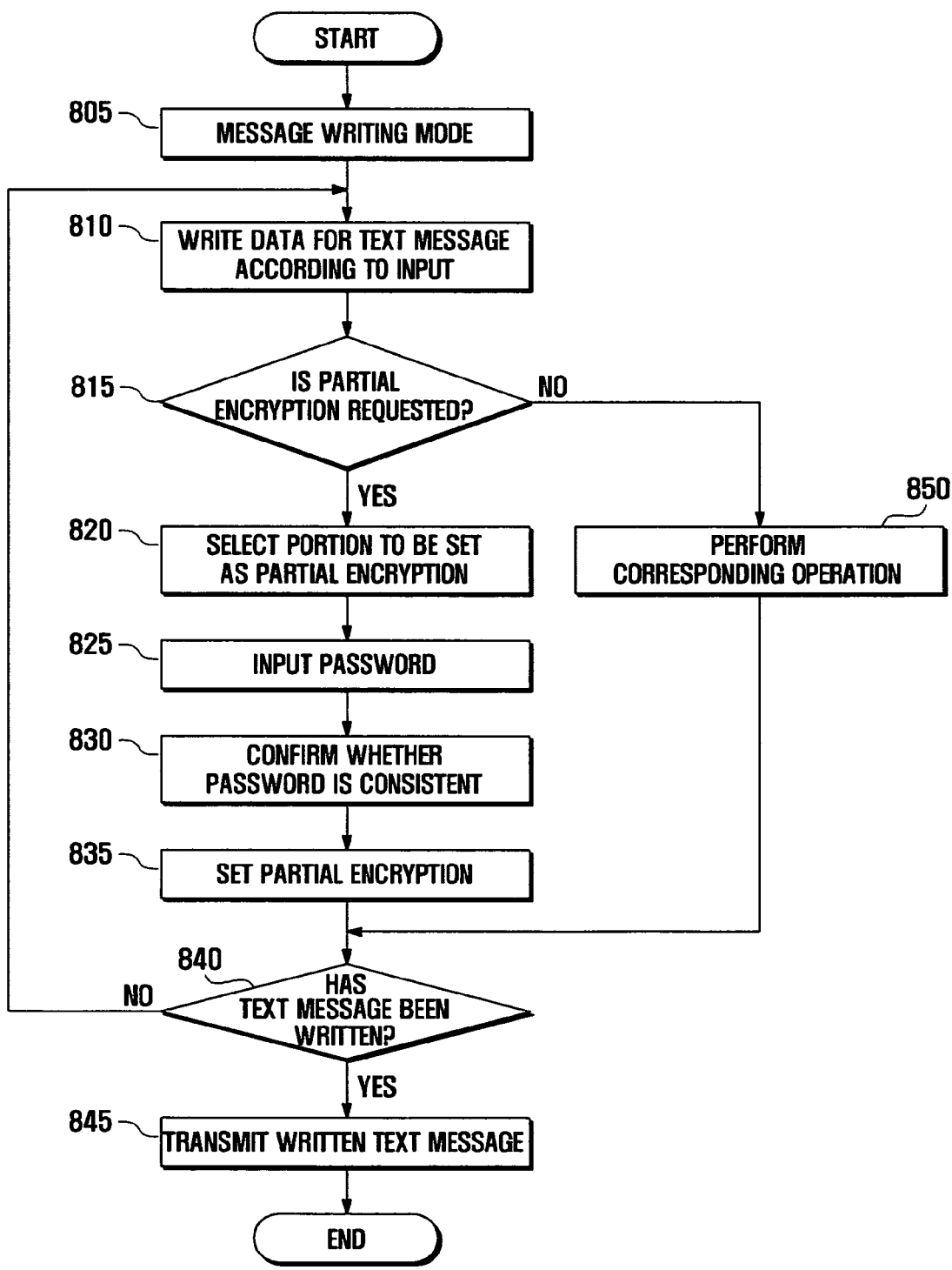
FIG. 8 illustrates a flow chart describing a method for setting a partial encryption, according to an embodiment of the present invention.

FIG. 8 illustrates a flow chart describing a method for setting a partial encryption, according to an embodiment of the present invention.

Referring to FIG. 8, when the controller 130 receives a request to execute a message writing mode (block 805), it allows a portable terminal user to write a text message via the input unit 150 during the mode (block 810). Thereafter, the message encrypting unit 135 of the controller 130 determines whether the setting for a partial encryption is requested (block 815). If the message encrypting unit 135 ascertains that the setting for a partial encryption is requested at 815, it selects a portion of the text message that will be set by a partial encryption (block 820). The selection regarding the portion of the text message is performed according to the processes as shown on screens 730 and 740 of FIG. 7.

When the portion of the text message has been selected at 820, the message encrypting unit 135 inputs a password as shown on screen 750 (block 825). In an embodiment of the present invention, the input password is a preset password for the security of the portable terminal. Thereafter, the message encrypting unit 135 determines whether the input password is consistent with the preset password (block 830). If the message encrypting unit 135 ascertains that the input password is consistent with the preset password at block 830, it encrypts the portion of the text message, which is called a partially encrypted portion, (block 835). Alternatively, if the message encrypting unit 135 ascertains that the input password is not consistent with the preset password at block 830, it further performs a request to re-input a password (not shown).

After that, the controller 130 determines whether the text message has been written (block 840). If the controller 130 ascertains that the text message has been written at block 840, it transmits the text message to the called portable terminal (block 845). The controller 130 of the caller's portable terminal converts the password, set to the partially encrypted portion, into a public key and then transmits it to the receiver's portable terminal, so that the called portable terminal receives the text message containing the partially encrypted portion and decrypts the partially encrypted portion by the cryptographic key that set the called portable terminal. In an embodiment of the present invention, although the caller's portable terminal converts the password into a public key and then transmits it to the called portable terminal, so that the called portable terminal decrypts it by its cryptographic key; however, the present invention is not limited to this embodiment. For example, if the called portable terminal user may know the password or decrypt the partially encrypted portion, the portable terminal can transmit the password to the called portable terminal without converting it to the public key. The portable terminal can also transmit information about the password to the called portable terminal using the other methods, so that the called portable terminal user can decrypt the partially encrypted portion.

Alternatively, if the controller 130 ascertains that the text message has not been written at block 840, it returns to and proceeds with block 810. Also, if the message encrypting unit 135 ascertains that the setting for a partial encryption is not requested at block 815, it performs a corresponding function (block 850) and then proceeds with step 840.

As described above, the method and apparatus, according to the present invention, can encrypt part of user data in a portable terminal, and thus increase user convenience and security. The method and apparatus can also encrypt part of the data that is contained in the text messages, stored in the portable terminal, and the text messages that will be transmitted.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A message encryption method by a portable terminal, the method comprising:
   displaying content of a message;
   receiving a first password to set encryption for a portion of the displayed content;
   encrypting the portion of the displayed content using the received first password;
   displaying the message in which the encrypted portion is hidden;
   transmitting the message including the encrypted portion to an external device; and
   displaying, when a user input is detected in the hidden encrypted portion, an input window configured to receive one second password for decrypting the encrypted portion,
   wherein the portion of the displayed content comprises a plurality of noncontiguous portions of the displayed content, and the plurality of noncontiguous portions of displayed content are encrypted with the one second password.

2. The method of claim 1, wherein encrypting the portion of the displayed content further comprises:
   setting the first password for encryption.

3. The method of claim 1, wherein the portion of the displayed content is set by selecting a first position in the content with a pointer or cursor, and then moving the pointer or cursor from the first position to a second position according to a movement operation inputted to an input unit, where the portion of the displayed content is marked by a highlight bar, the first position comprising one of a beginning point and an end point of the portion of the displayed content and the second position comprising the other of the beginning point and the end point of the portion of the displayed content.

4. The method of claim 2, further comprising:
   when a request is inputted to transmit the message that is written in a message writing mode and the message includes the encrypted portion, converting the first password to a public key, wherein the transmitted message includes the public key.

5. The method of claim 4, wherein the public key comprises a cryptographic key that allows the external device to decrypt the encrypted portion using the cryptographic key for a terminal encryption, set in the external device.

6. The method of claim 1, further comprising:
   when the one second password inputted to the input window is consistent with a preset password, displaying the message in which the encrypted portion is decrypted.

7. A portable terminal, comprising:
   a display unit configured to display content of a message;
   an input unit configured to receive a selection input for at least a portion of the displayed content, and receive one password to set encryption for the portion, the portion of the displayed content comprising a plurality of noncontiguous portions of the displayed content, the plurality of noncontiguous portions of displayed content being encrypted with the one password;
   a RF communication module configured to perform RF communication with an external device; and
   a controller configured to encrypt the portion of the displayed content using the received one password, control the display unit to display the message in which the encrypted portion is hidden, control the RF communication module to transmit the message including the encrypted portion to an external device, and control the display unit to display, when a user input is detected in the hidden encrypted portion, an input window for decrypting the encrypted portion.

8. The portable terminal of claim 7, wherein the controller is configured to request the input of a second password that will be set for the encryption.

9. The portable terminal of claim 7, wherein the portable terminal further comprises:
a storage unit configured to store the message including the encrypted content and information associated with the one password.

10. The portable terminal of claim 7, wherein the input unit is configured to select the portion of the content by selecting a first position in the content with a pointer or cursor, and then moving the pointer or cursor from the first position to a second position according to a movement operation configured to be inputted to the input unit, where the portion of the content is marked by a highlight bar, the first position comprising a beginning point of the portion of the displayed content and the second position comprising an end point of the portion of the displayed content.

11. The portable terminal of claim 8, wherein the controller is configured to convert the second password to a public key when a request is inputted to transmit the message that is written in a message writing mode and includes the encrypted portion, wherein the transmitted message includes the public key.

12. The portable terminal of claim 11, wherein the public key is a cryptographic key that is configured to allow the other wireless transmitter to decrypt the encrypted portion using the cryptographic key for a terminal encryption, set in the wireless transmitter.

13. The portable terminal of claim 8, wherein the controller is configured to request the input of the one password for the decryption when the message is encrypted and display of the message is requested, and determines whether the input one password is consistent with a preset password.

14. The method of claim 1, wherein the encrypted portion is hidden by a highlighted bar, the highlighted bar configured such that when a pointer moves over the highlighted bar, the input window is automatically displayed.

15. The portable terminal of claim 7, wherein the encrypted portion is hidden by a highlighted bar, the highlighted bar configured such that when a pointer moves over the highlighted bar, the input window is automatically displayed.

16. The portable terminal of claim 7 further comprising a message encrypting unit configured to compare the received one password with a preset password, the preset password being the same as a previously set password for security of the portable terminal.

17. The method of claim 3, further comprising:
when a request is inputted to transmit the message that is written in a message writing mode and the message includes the encrypted portion, converting the first password to a public key, wherein the transmitted message includes the public key.

18. The method of claim 17, wherein the public key comprises a cryptographic key that allows the external device to decrypt the encrypted portion using the cryptographic key for a terminal encryption, set in the external device.

19. The portable terminal of claim 10, wherein the controller is configured to convert the one password to a public key when a request is inputted to transmit the message that is written in a message writing mode and includes the encrypted portion, wherein the transmitted message includes the public key.

20. The portable terminal of claim 19, wherein the public key is a cryptographic key that is configured to allow the other wireless transmitter to decrypt the encrypted portion using the cryptographic key for a terminal encryption, set in the wireless transmitter.

* * * * *